(12) United States Patent
Marchal et al.

(10) Patent No.: US 10,267,477 B2
(45) Date of Patent: Apr. 23, 2019

(54) LIGHT BEAM LIGHTING MODULE FOR MOTOR VEHICLE HEADLIGHT

(71) Applicant: VALEO VISION, Bobigny (FR)

(72) Inventors: Orane Marchal, Bobigny (FR); David Bourdin, Bobigny (FR); Stephane Andre, Bobigny (FR); Fabrice Mairet, Bobigny (FR); Sergio Donoso, Martos (ES); Ran Fujita, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/886,436

(22) Filed: Feb. 1, 2018

(65) Prior Publication Data

US 2018/0216794 A1 Aug. 2, 2018

(30) Foreign Application Priority Data

Feb. 1, 2017 (FR) ...................................... 17 50842

(51) Int. Cl.
*F21S 41/37* (2018.01)
*F21S 41/25* (2018.01)
(Continued)

(52) U.S. Cl.
CPC ................ *F21S 41/37* (2018.01); *B60Q 1/14* (2013.01); *F21S 41/143* (2018.01); *F21S 41/25* (2018.01);
(Continued)

(58) Field of Classification Search
USPC .................................................. 362/545, 539
See application file for complete search history.

(56) References Cited

U.S. PATENT DOCUMENTS 7,993,043 B2 * 8/2011 Sazuka ..................... B60Q 1/14
362/509
8,651,716 B2 * 2/2014 Albou ....................... F21V 7/04
362/520
(Continued)

FOREIGN PATENT DOCUMENTS

CN 104373901 2/2015
CN 104832859 8/2015
(Continued)

OTHER PUBLICATIONS

French Preliminary Search Report dated Oct. 23, 2017 in French Application 17 50842 filed on Feb. 1, 2017 (with English Translation of Categories of Cited Documents).

*Primary Examiner* — Laura Tso
(74) *Attorney, Agent, or Firm* — Oblon, McClelland, Maier & Neustadt, L.L.P.

(57) ABSTRACT

A lighting module for a motor vehicle includes a first light source and a first collimator for generating a first light beam of "low beam" type in collaboration with a first projection lens. Also included are second and a third light sources, the second light source collaborating with a second collimator to generate a first beam complementing the first light beam in order to form a second light beam of "high beam" type. In order to reduce the visibility of a cut-off zone in the second beam, the third light source collaborates with a third collimator and/or a second projection lens in order to form a second complementary beam which at least partly overlaps the cut-off zone. A front headlight for a motor vehicle can include such a lighting module.

22 Claims, 2 Drawing Sheets

(51) Int. Cl.
*F21S 41/663* (2018.01)
*B60Q 1/14* (2006.01)
*F21S 41/143* (2018.01)
*F21S 41/255* (2018.01)
*F21S 41/26* (2018.01)
*F21S 41/265* (2018.01)
*F21S 41/32* (2018.01)
*F21S 41/36* (2018.01)
*F21S 41/43* (2018.01)
*F21S 41/40* (2018.01)

(52) U.S. Cl.
CPC .............. *F21S 41/255* (2018.01); *F21S 41/26* (2018.01); *F21S 41/265* (2018.01); *F21S 41/322* (2018.01); *F21S 41/36* (2018.01); *F21S 41/40* (2018.01); *F21S 41/43* (2018.01); *F21S 41/663* (2018.01)

(56) References Cited

U.S. PATENT DOCUMENTS

| | | | |
|---|---|---|---|
| 2009/0103323 | A1 | 4/2009 | Ishida |
| 2014/0092619 | A1 | 4/2014 | Bushre |
| 2015/0241030 | A1 | 8/2015 | Kanayama et al. |
| 2015/0321598 | A1* | 11/2015 | Kanayama .............. F21S 41/19 362/487 |
| 2016/0039330 | A1 | 2/2016 | Rosenhahn et al. |
| 2016/0377249 | A1 | 12/2016 | Kanayama et al. |

FOREIGN PATENT DOCUMENTS

| | | |
|---|---|---|
| DE | 10 2008 051 915 A1 | 4/2009 |
| EP | 2 523 022 A1 | 11/2012 |
| EP | 2 982 902 A1 | 2/2016 |
| JP | 2013-239362 | 11/2013 |

* cited by examiner

LIGHT BEAM LIGHTING MODULE FOR MOTOR VEHICLE HEADLIGHT

TECHNICAL FIELD

The present invention lies in the field of the motor vehicle industry, and relates more particularly to lighting devices, in particular headlights for motor vehicles. In particular, the present invention relates to a lighting module allowing at least two light beams to be generated.

PRIOR ART

In this field, lighting modules are known that allow the generation of a light beam of low beam type, with a range of approximately 70 meters, used mainly at night, and in which the configuration of said light beam is such that it makes it possible to not dazzle the driver of an oncoming motor vehicle or a motor vehicle being followed. Typically, such a light beam exhibits a cut-off zone that in particular takes the form of a contrast change curve in which:
- a first part is situated below the horizon on a first side of the road on which a motor vehicle arriving in the opposite direction is likely to be located;
- a second part is situated above the horizon on a second side of the road opposite the first side in relation to a central line of said road;
- an oblique intermediate part linking the first part and the second part of the contrast change curve in a central region.

Lighting modules are known that make it possible to alternately generate a first light beam of the low beam type described previously, and a second light beam of high beam type. Such lighting modules implement a first light source associated with a first collimator in order to generate the first light beam, and a second light source associated with a second collimator in order to generate a first complementary beam which forms the second light beam in collaboration with the first light beam.

In the case of a perfectly set lighting module, the first complementary beam generated by the second light source should be shaped, oriented and positioned in such a way as to perfectly juxtapose the first light beam generated by the first light source, such that the second light beam would then exhibit a photometry that is virtually symmetrical in relation to a median axis, the lighting of the road being substantially uniform from one side to the other of said road, particularly above the horizon axis.

In practice, it is difficult to obtain a photometry that is both symmetrical and uniform for a light beam of high beam type generated by such lighting modules. Indeed, the complementarity of the shaping, of the orientation and of the positioning of the first complementary beam in relation to the first light beam are very difficult to obtain, even impossible to obtain.

Consequently, the lighting modules arranged to alternately generate the first light beam of low beam type and the second light beam of high beam type often exhibit a light contrast zone corresponding to the defect of correlation between the first light beam and the first complementary beam. This contrast zone can be a zone of lesser contrast—corresponding to a darker zone—if the first complementary beam is away from the first light beam, or it can be a zone of stronger contrast—lighter—when the first complementary beam overlaps the first light beam. Often, the contrast zone corresponds at least partly to the cut-off zone of the first light beam.

Consequently, the fact that it is impossible to optimally set such lighting modules at reasonable costs for the motor vehicle field causes said lighting modules to be the source of discomfort for the driver of the motor vehicle who perceives at least a part of the cut-off zone, in the form of a variation of a density of lighting of the part of the road lit by the light beam of high beam type.

The object of the present invention is to at least partly address the above issues and to also work towards other advantages by proposing a novel lighting module for a motor vehicle.

Another aim of the present invention is to reduce the visibility of the cut-off zone in the generation of a light beam of high beam type for such a lighting module.

Another aim of the present invention is to simplify the integration of the light modules in a motor vehicle headlight.

SUMMARY OF THE INVENTION

According to a first aspect of the invention, at least one of the abovementioned objectives is achieved with a lighting module for a motor vehicle, said lighting module comprising (i) a support, (ii) a first light source and a second light source secured to the support, (iii) a first collimator and a second collimator, the first collimator being arranged to collect at least a part of the light rays emitted by the first light source, and the second collimator being arranged to collect at least a part of the light rays emitted by the second light source, each collimator being also arranged to redirect said light rays towards a projection lens secured to the support, the projection lens being arranged to shape at least a part of the light rays emitted by the light sources in order to:
- project at least a part of the light rays collected by the first collimator in a first light beam comprising a cut-off zone; and
- project at least a part of the light rays collected by the first collimator and at least a part of the light rays collected by the second collimator in a second light beam, the part of the light rays collected by the second collimator forming a first complementary beam of the first light beam, said second light beam being formed by said first light beam and said first complementary beam, said first complementary beam being delimited at least partly by the cut-off zone.

The lighting module according to the first aspect of the invention comprises at least one third light source and an optical device arranged to shape at least a part of the light rays emitted by the third light source so as to form a second complementary beam at least partly overlapping the cut-off zone of the first light beam, the third source and the optical device being secured to the support.

The support of the lighting module according to the first aspect of the invention is a mechanical reference piece on which the various elements of said lighting module are referenced in order to allow them to collaborate together in order to generate at least the first and second light beams making it possible to produce a high beam and—alternately—a low beam as described previously. As a nonlimiting example, the support of the lighting module according to the first aspect of the invention can take the form of a plate or of at least a part of a housing of said lighting module. The support can be metal or made of plastic material.

Elements of the lighting module should be understood in particular to be the first, the second and the third light sources, the first and second collimators, the projection lens, and, generally, any member of the lighting module actively or passively involved in the operation thereof.

The lighting module according to the first aspect of the invention thus comprises at least three distinct light sources making it possible, alternately or cumulatively, to respectively form the first light beam or the second light beam. Each light source comprises at least one light emission element arranged to emit light rays when it is polarized by an electrical current. Preferentially, the light emission element takes the form of a light-emitting diode emitting at least a part of its light rays in the spectral domain visible to the human eye. Thus, each light source of the lighting module according to the first aspect of the invention can comprise one or a plurality of light-emitting diodes making it possible to generate the first and/or the second light beam. The light-emitting diodes forming each light source are selectively or collectively addressable in order to more precisely illuminate particular zones of the road situated in front of the motor vehicle.

The first and/or second and/or third light sources are secured to the support in order to allow them to collaborate with one another, in particular to generate the second light beam and/or to make it possible to produce an alignment according to an optical axis of the lighting module according to the first aspect of the invention and/or in relation to the projection lens. Advantageously, the first and/or second and/or third light sources are securely fixed to the support by any known fixing means, removable or non-removable. In particular, each light source can be immovably fixed to the support, through a mechanical link allowing no degree of freedom between the light source and the support. In this case, each light source is positioned and/or oriented and/or aligned relative to the support and/or to the projection lens in particular when said light source is mounted on said support, according to a factory setting that cannot subsequently be modified. Alternatively, each light source can be fixed to the support through a mechanical link allowing at least one degree of freedom in relation to the support and/or to the projection lens and/or to the corresponding collimator, in order to allow said light source to be set to produce, for example, an optical alignment necessary to the correct operation of the lighting module.

In the lighting module according to the first aspect of the invention, each light source is associated with at least one collimator in order to collect at least a part of the light rays generated by said corresponding light source and to redirect them towards a particular direction, in particular the projection lens of said lighting module. Advantageously, at least a part of the collimators are arranged to form a cut-off profile on the light beam generated by the lighting module, without requiring any additional element, such as, for example, a metal plate fixed between the first and the second collimators. In this case, the at least one collimator arranged to form the cut-off profile also makes it possible to reflect at least a part of the light rays collected by the other collimator(s) towards the projection lens.

According to a variant of the invention, the lighting module can comprise a plurality of first light sources associated with a plurality of first collimators, and/or a plurality of second light sources associated with a plurality of second collimators, and/or a plurality of third light sources associated with a plurality of third collimators.

In all the variant embodiments of the invention, the light sources can be addressed selectively or collectively.

Each collimator is produced in a plastic material and/or in glass. Advantageously, each collimator is formed by a transparent material having a refractive index greater than the refractive index of air. Polycarbonate (PC) suitable for withstanding the heat generated by the light sources will preferentially be used. The choice of this material is particularly advantageous, in as much as the light sources are located in proximity to the corresponding collimators. In other exemplary embodiments, the collimators can be made of polypropylene carbonate (PPC) or of polymethyl methacrylate (PMMA).

In the lighting module according to the first aspect of the invention, the projection lens is arranged to shape the light rays generated by the light sources and collected by the corresponding collimators in order to form the corresponding light beam according to a high beam or to a low beam as described previously.

The projection lens is produced in a plastic material and/or in glass. Polycarbonate (PC), polypropylene carbonate (PPC) or polymethyl methacrylate (PMMA) will preferentially be used.

The projection lens is secured to the support in order to collaborate with the light source or sources and their respective collimators to generate the first and second light beams to facilitate the alignment thereof in relation to the optical axis of the lighting module according to the first aspect of the invention. Advantageously, the projection lens is securely fixed to the support according to any known fixing means, removable or non-removable. In particular, the projection lens can be fixed immovably to the support, through a mechanical link allowing no degree of freedom between said projection lens and the support. In this case, the projection lens is positioned and/or oriented and/or aligned in relation to the support and/or to the light sources and/or to the corresponding collimators when said projection lens is mounted on said support, according to a factory setting that cannot subsequently be modified. Alternatively, the projection lens can be fixed to the support through a mechanical link allowing at least one degree of freedom in relation to said support and/or to the light sources and/or to the corresponding collimators, in order to allow a setting of said projection lens for the optical alignment thereof necessary to the correct operation of the lighting module.

The lighting module according to the first aspect of the invention thus makes it possible to alternately generate the first light beam corresponding to the low beam described previously, or the second light beam corresponding to the high beam as described previously. Advantageously, the lighting module according to the first aspect of the invention makes it possible to obtain the second light beam by the superposition of the second complementary beam on the first and second light rays generated respectively by the first and second light sources. The second complementary beam is generated by the third light source and dedicated specifically to processing the cut-off zone of the first light beam and that can be seen in the second light beam of the known lighting modules. To this end, the second complementary beam is shaped and/or oriented and/or positioned by the optical device so as to at least partially cover the cut-off zone. The optical device can take several forms according to different variants of the invention which will be described in the paragraphs below. Generally, the optical device can comprise a lens and/or a reflector, used alone or in combination with, in particular, other optical elements such as the third collimator.

The lighting module according to the first aspect of the invention can advantageously comprise at least one of the following refinements, the technical features forming these refinements being able to be taken alone or in combination:

the optical device is arranged to form the second complementary beam such that said second complementary beam is oriented towards a central part of the cut-off zone in order to reduce the nuisance associated with said cut-off zone;

according to a first variant embodiment, the optical device comprises at least one third collimator for collecting at least a part of the light rays emitted by the third light source and for redirecting them so as to at least partly overlap the cut-off zone of the first light beam and/or of the second light beam. Possibly, the projection lens arranged to shape at least a part of the light rays emitted by the first and second light sources forms a first projection lens, and the lighting module comprises a second projection lens of a form that is neutral with respect to the light rays collected by the third collimator. In this case, the optical device also comprises the second projection lens. In this first variant embodiment, the third collimator collecting the light rays generated by the third light source is configured to directly shape said light rays in order to form the second complementary beam according to the invention. When the optical device comprises the second projection lens, said second projection lens does not serve any shaping purpose: its neutral form allows the light rays collected by the third collimator to pass without modifying the trajectory thereof. In this case, the second projection lens serves a purpose of closure of the lighting module according to the first aspect of the invention, in order to avoid a loss of performance levels;

according to a second variant embodiment alternative to the first variant embodiment, the projection lens arranged to shape at least a part of the light rays emitted by the first and second light sources forms a first projection lens, and the optical device comprises at least one third collimator for collecting at least a part of the light rays emitted by the third light source and for redirecting them towards a second projection lens configured to project at least a part of the light rays collected by the third collimator in order to form a second complementary beam at least partly overlapping the cut-off zone of the first light beam and/or of the second light beam. In this case, the optical device comprises the second projection lens. Advantageously, the second projection lens is of cylindrical form with respect to the light rays collected by the third collimator. In this second variant embodiment, the third collimator collecting the light rays generated by the third light source collaborates with the second projection lens in order to form the second complementary beam according to the invention. In this case, the second projection lens does indeed serve a light shaping function. The second light beam is thus generated by the lighting module according to the first aspect of the invention by the collaboration of the first and second light sources—associated with their respective collimators—with the first projection lens on the one hand, and the third light source—associated with the third collimator—with the second projection lens;

the second and the third collimators can be made of a single piece in order to reduce the costs of production of said collimators and to facilitate the operations of mounting and of assembly of the lighting module according to the first aspect of the invention;

the third collimator and/or the third light source are situated above or below a plane including the optical axis of the lighting module in order to reduce the compactness of said lighting module;

the second projection lens is situated below or above the first projection lens in order to reduce the compactness of the lighting module;

according to a first variant embodiment, the second projection lens is made of a single piece with the first projection lens. In other words, the first and the second lenses are formed by one and the same optical piece comprising several different optical zones, with different optical properties and/or focal distances, a first optical zone corresponding to the first projection lens, and a second optical zone corresponding to the second projection lens. Alternatively, according to a second variant embodiment, the second projection lens is added to the first projection lens and securely fixed to said first projection lens by fixing means. Possibly, the first projection lens and the second projection lens can be secured to one another via the support, each projection lens being fixed securely to the support, without said projection lenses being in any way fixed securely to one another through a direct mechanical link between them;

the first projection lens comprises a single focal plane towards which the first collimator and the second collimator are arranged to redirect the corresponding light rays. This advantageous configuration makes it possible to simplify the design and the mounting of the lighting module;

the third collimator is arranged to redirect light rays from the third light source towards a focal plane of the second projection lens distinct from the focal plane of the first projection lens;

a first focal distance separating the first projection lens from the focal plane of said first projection lens is greater than a second focal distance separating the second projection lens from the focal plane of said second projection lens. Alternatively, a first focal distance separating the first projection lens from the focal plane of said first projection lens is less than a second focal distance separating the second projection lens from the focal plane of said second projection lens;

at least one of the first and second collimators extends towards the focal plane of the first projection lens to reflect a part of the light emitted by the other collimator so as to form the cut-off zone of the first light beam and/or of the second light beam;

according to a first embodiment, at least one of the first and second collimators is arranged to form the cut-off zone by external reflection of at least a part of the light rays collected by the other collimator. In this first embodiment, the external reflection is obtained, for example, by the application of a metal coating over at least a part of a face of at least one of the first and second collimator situated facing the other collimator, preferentially parallel—even tangential—to the optical axis, such that at least a part of the light rays collected by the other collimator are reflected on the metal coating so as to be redirected towards the projection lens. According to a second embodiment alternative to the first embodiment, at least one of the first and second collimators is arranged to form the cut-off zone by glass reflection of at least a part of the light rays collected by the other collimator. According to a third embodiment alternative or complementary to the first and second embodiments, at least one of the first and second collimators is arranged to form the cut-off zone by total reflection of at least a part of the light rays originating from the associated light source. To this end, the at least one collimator is formed in a material of refractive index such that a light ray arriving on a wall of the at least one collimator with an angle of incidence greater than a predetermined value, is totally reflected on this wall, without a not-inconsiderable part of the energy of said light ray being transmitted through said wall;

at least one of the first and second collimators comprises a reflecting coating arranged over a part of said collimator and intended to reflect at least a part of the light rays collected by the other collimator in order to allow a total reflection as described previously;

the part of the collimator over which the coating is arranged extends from the focal plane towards the corresponding light source;

the first and/or the second and/or the third collimators are separated by a medium of refractive index lower than a refractive index of said collimators:

the first and/or the second and/or the third light sources are arranged so as to emit light rays in directions substantially parallel to an optical axis of the lighting module.

According to a second aspect of the invention, a motor vehicle headlight is proposed comprising at least one lighting module according to the first aspect of the invention or according to any of the refinements thereof.

Various embodiments of the invention are provided, incorporating, according to all of their possible combinations, the different optional features explained herein.

DESCRIPTION OF THE FIGURES

Other features and advantages of the invention will become more apparent through the following description on the one hand, and through several exemplary embodiments given in an indicative and nonlimiting manner with reference to the attached schematic drawings on the other hand, in which.

Obviously, the features, the variants and the various embodiments of the invention can be associated with one another, according to various combinations, in as much as they are not incompatible with or exclusive of one another. It will in particular be possible to devise variants of the invention comprising only a selection of features described hereinbelow isolated from the other features described, if this selection of features is sufficient to confer a technical advantage or to differentiate the invention over the prior art.

In particular, all the variants and all the embodiments described can be combined with one another and there is nothing to oppose such combination technically.

In the figures, the elements common to several figures retain the same reference.

DETAILED DESCRIPTION OF THE INVENTION

Hereinbelow in the description, the references "longitudinal", "lateral", "above", "below", "in front", "behind" refer to the orientation of the light module as it is intended to be incorporated in a motor vehicle front headlight. More particularly, a longitudinal direction corresponds to an optical axis A along which the light rays generated by the lighting module 100 mostly extend. The lateral orientation corresponds to a first direction at right angles to the optical axis A and which extends horizontally. Finally, the vertical direction corresponds to a second direction at right angles to the optical axis A and to the first right-angled direction, the vertical direction extending vertically.

Figure 1:
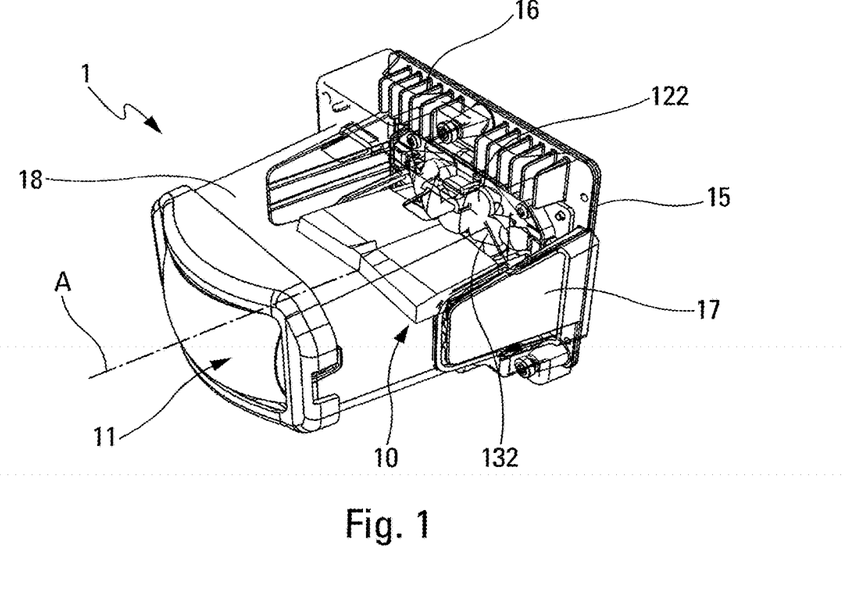
FIG. 1 illustrates a perspective view of an exemplary embodiment of a headlight for a motor vehicle according to the second aspect of the invention.

Referring to FIG. 1, a motor vehicle headlight 1 is represented, and more particularly a front headlight, the headlight 1 comprising a lighting module 10 arranged to generate and project one or more types of light beams onto a road. In particular, the lighting module 10 is arranged to be able to alternately or simultaneously generate a light beam of low beam type and a light beam of high beam type. As described previously, the light beam of low beam type low exhibits a cut-off zone Zc in order to avoid dazzling the drivers of the vehicles travelling in the opposite direction on the road; and the light beam of high beam type exhibits a road lighting that is required without cut-off profile. To this end, and according to the first aspect of the invention, the lighting module 10 implements an optical device that makes it possible to enhance the uniformity of the lighting of the beam of high beam type, in particular by reducing the light contrast variations in the cut-off zone Zc. The specifics of the lighting module 10 according to the first aspect of the invention will be described more particularly with reference to FIGS. 2 and 3.

The headlight 1 comprises a mounting plate 15 situated on the rear face of said headlight and on which are mounted light sources and collimators 122, 132 of the lighting module 10. The mounting plate is associated with a housing 18 held by fixing tabs 17 situated at the periphery of the mounting plate 15, preferentially on the lateral edges of the headlight 1. At the front, the headlight 1 is closed by a transparent outer lens 11 that can be passed through by the light beams generated and projected by the lighting module 10 according to the first aspect of the invention. Generally, the headlight 1 can thus receive, in its internal volume, delimited in particular by the housing 18, the support plate 15 and the transparent outer lens 11, a plurality of light modules 10 according to the first aspect of the invention.

Advantageously, such a lighting module 10 forms a unitary subassembly: it is arranged to be able to create and shape at least the beams of high beam and low beam type described previously, without needing to be associated with other light sources situated outside of said lighting module 10. The lighting module 10 is secured to the housing of the headlight via an adjustment means that makes it possible to modify a height of the optical axis A, and/or a lateral direction.

In order to dissipate the calories produced in particular by the light sources and/or their associated electronics, the headlight 1 comprises a heat exchanger which here takes the form of a heatsink with fins 16. The fins are arranged on the support plate 15, facing the transparent outer lens 11, and peripherally to said light sources and/or collimators 122, 132. Possibly, the headlight 1 can also comprise another finned heat sink situated on the rear face of said headlight 1, opposite the finned heat sink 16 in relation to the support plate 15.

Figure 2:
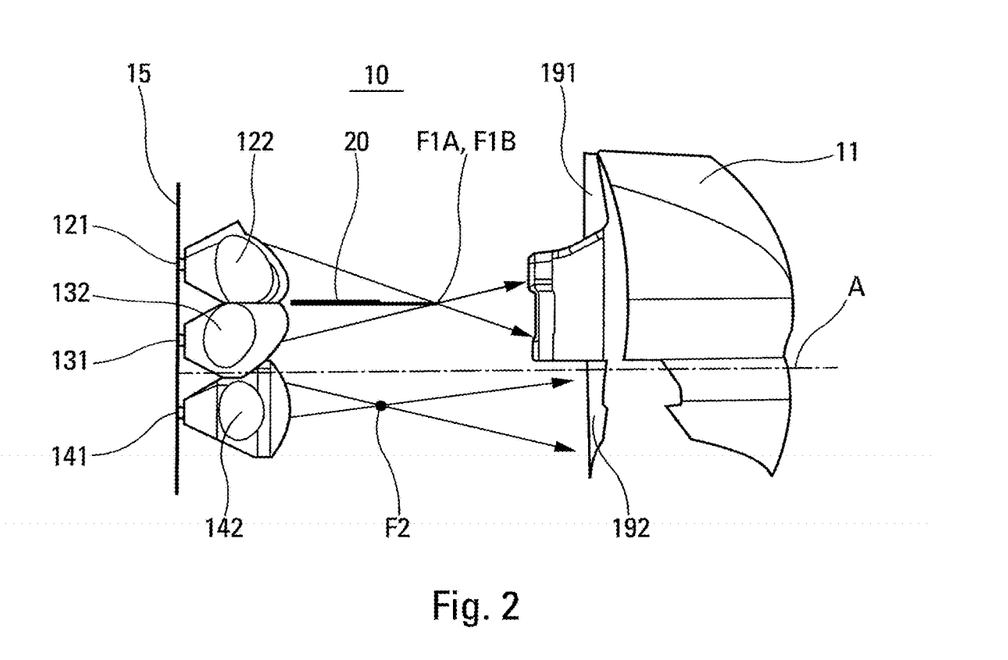
FIG. 2 illustrates a side view of an exemplary embodiment of a light module according to the first aspect of the invention.
Figure 3:
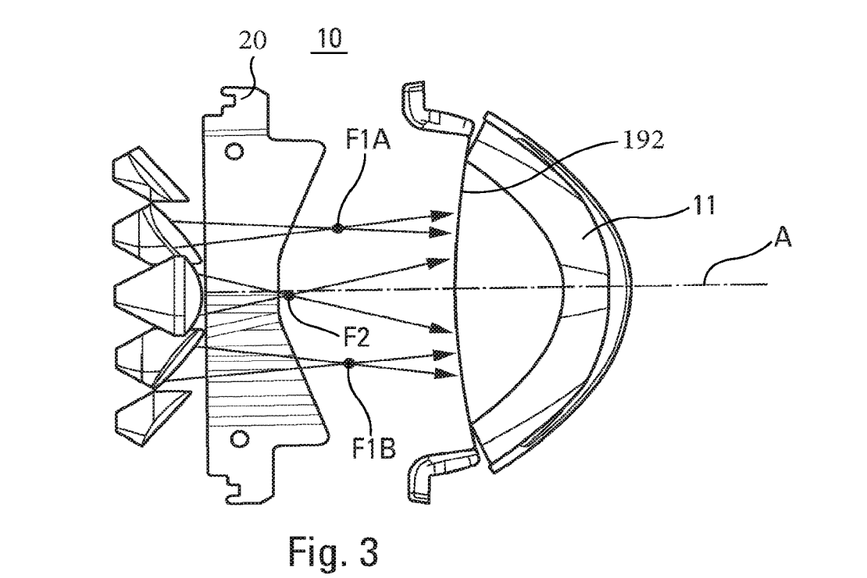
FIG. 3 illustrates a plan view of the exemplary embodiment of the light module illustrated in FIG. 2.

The lighting module 10 comprises at least one light source that can be seen in FIGS. 2 and 3. It also comprises at least one projection lens 2 arranged in the lighting module 10 so as to be passed through by the light rays emitted by the light source. Such a projection lens is involved in the forming of the desired light beam, whether it be a beam of low beam type or a beam of high beam type. The projection lens 2 forms a first longitudinal end of the lighting module 10.

Referring to FIGS. 2 and 3, an exemplary embodiment of a lighting module 10 according to the first aspect of the invention will now be described in more detail.

The lighting module 10 comprises:

the support plate 15;

a first light source 121 associated with the first collimator 122 arranged on the one hand to collect at least a part of the light rays emitted by at least the first light source 121 and, on the other hand, to redirect said light rays towards a first projection lens 191 secured to the support plate 15;

a second light source associated with the second collimator 132 arranged, on the one hand, to collect at least a part of the light rays emitted by at least the second light source 131 and, on the other hand, to redirect said light rays towards the first projection lens 191.

The first projection lens 191 is arranged along the optical axis A. It is arranged to project the light rays collected by at least the first and second collimators 122, 132 in order to produce one of the two lighting modes described previously, depending on whether one or both of the light sources 121, 131 are switched on. In other words, the first projection lens 191 makes it possible to:

project at least a part of the light rays collected by the first collimator 122 in a first light beam comprising a cut-off zone Zc; and project at least a part of the light rays collected by the first collimator 122 and at least a part of the light rays collected by the second collimator 132 in a second light beam, the part of the light rays collected by the second collimator 132 forming a first complementary beam of the first light beam, said second light beam being formed by said first light beam and said first complementary beam, said first complementary beam being delimited at least partly by the cut-off zone Zc.

The first projection lens 191 is preferentially of convergent type. The first projection lens 191 is secured to the lighting module 10, and more particularly to the support plate 15, via at least one lens support—not represented—that makes it possible to produce the mechanical support of the first projection lens 191 and a mechanical referencing for the position of the first projection lens 191 in relation to the first 121 and second 131 light sources.

According to the first aspect of the invention, the lighting module 10 comprises at least one third light source 141 and an optical device 142, 192 arranged to shape at least a part of the light rays emitted by the third light source 141 so as to form a second complementary beam at least partly overlapping the cut-off zone Zc of the first light beam and/or of the second light beam.

The first light beam corresponds to the beam of low beam type described previously; and the second light beam corresponds to the beam of high beam type described previously.

The first 121, the second 131 and the third 141 light sources are secured to the support plate 15. For example, they are welded onto the support plate 15.

In the example illustrated in FIGS. 2 and 3, the lighting module 10 comprises a second projection lens arranged to form the second complementary beam at least partly overlapping the cut-off zone Zc of the first light beam and/or of the second light beam. Thus, in this exemplary embodiment, the optical device 142, 192 is formed by the second projection lens 192 and by the third collimator 142 configured to collect the light rays generated by the third light source 141 and to redirect them towards said second projection lens 192.

As described previously, each light source 121, 131, 141 is assigned to the generation of light rays and makes it possible, alone or in combination, in collaboration with the collimators 122, 132, 142 and the first projection lens 191 and/or the second projection lens 192, to project a light beam of "low beam" or "high beam" type.

To this end, the light sources are advantageously situated in one and the same plane represented in FIG. 2 by the plane of the support plate 15. Possibly, the light sources can be situated in different planes. Advantageously, they are all secured to the same support.

In the exemplary embodiment, the second projection lens 192 is made of a single piece with the first projection lens 191. Possibly, the second projection lens 192 can be added to the first projection lens 191. The second projection lens 192 is advantageously situated below the first projection lens 191.

FIG. 2 representing the lighting module 10 in a cross-sectional view according to a vertical plane, the light sources 121, 131, 141 and their respective collimators 122, 132, 142 are distributed vertically one above the other. More particularly, the first light source 121 and the second light source 131 are situated on a first side of the optical axis A, and the third light source 141 is situated on a second side of the optical axis A, opposite said first side in relation to said optical axis A. Moreover, the first light source 121 is situated at a greater distance from the optical axis A than the second light source 131.

Comparably, the first collimator 122 and the second collimator 132 are situated on the first side of the optical axis A, and the third collimator 142 is situated on the second side of the optical axis A, opposite said first side in relation to said optical axis A. Moreover, the first collimator 122 is situated at a greater distance from the optical axis A than the second collimator 132.

Generally, the configuration of the collimators 122, 132, 142 is identical to the configuration of the light sources 121, 131, 141.

Obviously, other configurations of the first 121, second 131 and third 141 light sources and/or of the first 122, second 132 and third 142 collimators could be envisaged without departing from the context of the present invention.

In the exemplary embodiment illustrated in FIGS. 2 and 3, the first and second collimators 122, 132 are configured to redirect the light rays generated by the first and second light sources 121, 131 towards a first focus F1A and a second focus F1B of the first projection lens 191; and the third collimator 142 is configured to redirect the light rays generated by the third light source 141 towards a focus F2 of the second projection lens 192. Advantageously, the first F1A and second F1B foci of the first projection lens 191 are situated in one and the same focal plane at right angles to the optical axis A. Possibly, the first F1A and second F1B foci of the first projection lens 191 can be situated in different focal planes.

Comparably, the focus F2 of the second projection lens 192 on the one hand and the first F1A and second F1B foci of the first projection lens 191 on the other hand are situated in different focal planes. A focal distance separating the first F1A and second F1B foci from the first projection lens 191 is less than a focal distance separating the focus F2 from the second projection lens 192.

In the horizontal plane illustrated in FIG. 3, the lighting module 10 comprises a plurality of light sources and of collimators in order to increase the lighting power available for said lighting module 10, and to make it conform to the lighting standards in force in the motor vehicle field. Each light source comprises at least one light-emitting diode and/or one laser diode. More particularly:

the first light source 121 comprises a first lighting element situated in proximity to the optical axis A, a second lighting element situated on a first side of the optical axis A and a third lighting element situated on a second side of the optical axis, opposite the first side in relation to the first lighting element, and preferentially in a symmetrical configuration;

the second light source 131 comprises a first lighting element situated in proximity to the optical axis A, a second lighting element situated on a first side of the optical axis A and a third lighting element situated on a second side of the optical axis, opposite the first side in relation to the first lighting element, and preferentially in a symmetrical configuration;

the third light source 141 comprises a first lighting element situated in proximity to the optical axis A, a second lighting element situated on a first side of the optical axis A and a third lighting element situated on a second side of the optical axis, opposite the first side in relation to the first lighting element, and preferentially in a symmetrical configuration.

Each collimator 122, 132, 142 extends towards the first 191 and/or the second 192 projection lens to reflect at least a part of the light rays originating from the light source 121, 131, 141 with which they are associated.

The lighting module 10 comprises an optical element 20 arranged to reflect at least a part of the light rays in order to define the cut-off zone Zc of the first light beam projected by the lighting module 10. In the example illustrated in FIG. 2, the optical element 20 is formed by a so-called folding metal plate.

Preferentially, the optical element 20 is formed by an axial extension along the optical axis A of the first collimator 122 which can extend towards the first lens to the first and second foci F1a, F1b of the first projection lens 191 in order to reflect at least a part of the light rays collected by one and/or the other of the first 122 and/or second 132 collimators to form the cut-off zone Zc of the first light beam projected by the lighting module 10 and/or of the second light beam projected by the lighting module 10.

To this end, in this preferential embodiment, the optical element 20 comprises a reflection surface for the light from the second collimator 132. More specifically, the cut-off zone Zc is produced by a surface element of the optical element 20 situated in proximity to the first and/or second focus F1a, F1b of the first projection lens 191, said surface element forming a dioptre between the first collimator 122 and an ambient medium of the lighting module 10, preferentially composed of air. The cut-off zone Zc is implemented by an external partial reflection of glass reflection type.

Figure 4A:
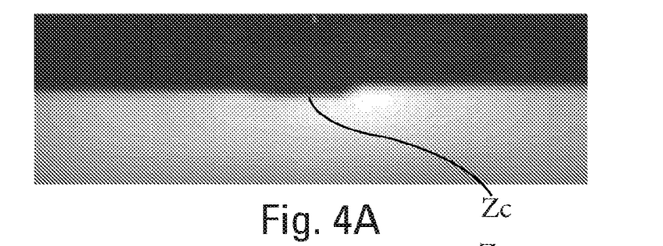
FIGS. 4A, 4B and 4C respectively illustrate a first light beam generated by the lighting module illustrated in the preceding figures, a first beam complementary to the first light beam and a second complementary beam that makes it possible to reduce the light contrast in the cut-off zone.
Figure 4B:
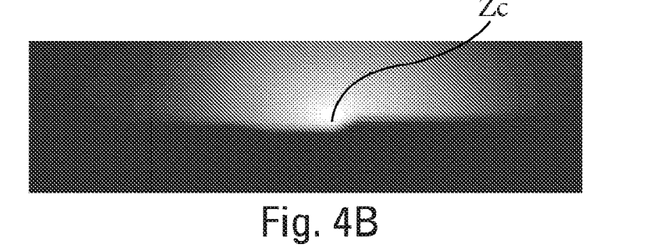
Figure 4C:
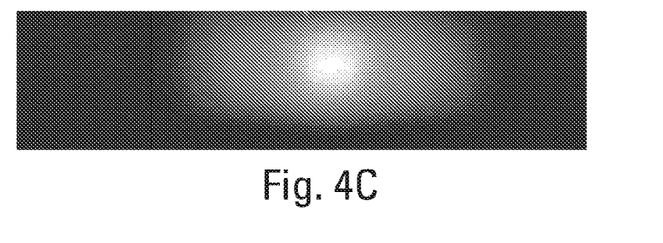

According to its first aspect, and as can be seen in FIGS. 4A, 4B and 4C, the lighting module 10 makes it possible to generate:

a first light beam of "low beam" type by the generation of light rays by the first light source 121, whose light rays are collected by the first collimator 122 and sent towards the first projection lens 191. Such a first light beam is illustrated in FIG. 4A;

a second light beam of "high beam" type by, simultaneously:

the generation of the first light beam described previously;

the generation of a first complementary beam by virtue of the second light source 131 and whose light rays are collected by the second collimator 132 and sent towards the first projection lens 191. Such a first complementary beam is illustrated in FIG. 4B. The first complementary beam illuminates a part of the road situated above the cut-off zone Zc of the first light beam and situated at the centre of the road. It can be seen that the cut-off zone Zc is still visible in the first complementary beam;

the generation of a second complementary beam by virtue of the third light source 141 and whose light rays are sent towards the optical device 142, 192. Such a second complementary beam is illustrated in FIG. 4C, making it possible to smooth over the visibility of the cut-off zone Zc once combined with the first light beam and with the first complementary beam.

Thus, according to the invention according to its first aspect, the lighting module 10 makes it possible to produce a second light beam of "high beam" type in which the cut-off zone Zc is smoothed over by virtue of the generation of the second complementary beam.

According to a first variant embodiment of the invention, the optical device 142, 192 comprises the third collimator 142 arranged to collect at least a part of the light rays emitted by the third light source 141 and to redirect them so as to at least partly overlap the cut-off zone Zc. In this first variant embodiment, the third collimator is arranged to directly allow with no other optical component—the shaping of the second complementary beam so that it reaches a central region of the road and slightly above the cut-off zone Zc in order to at least partly overlap said cut-off zone Zc.

Possibly, as an alternative to the third collimator, the optical device 142, 192 can comprise a lens or a reflector making it possible to collect the light rays generated by the third light source in order to shape them and redirect them along the optical axis A in order to at least partly overlap the cut-off zone Zc.

Advantageously, the optical device 142, 192 of the lighting module 10 can comprise the second projection lens 192 of a form that is neutral to the light rays collected by the third collimator 142 in order to protect the lighting module 10.

According to a second variant embodiment of the invention, the optical device 142, 192 comprises the third collimator 142 and the second projection lens 192. In this case, the third optical collimator 142 is arranged to collect at least a part of the light rays emitted by the third light source 141 and to redirect them towards the second projection lens 192. Contrary to the first variant embodiment, the third collimator 142 does not shape the light rays collected in such a way that they are configured to at least partly overlap the cut-off zone Zc; it is the second projection lens 192 which performs this function of shaping of the second complementary beam. To this end, the second projection lens 192 is advantageously of cylindrical form.

The collimators 122, 132, 142 are advantageously formed by a transparent material having a refractive index higher than the refractive index of air, preferably polycarbonate (PC) suitable for withstanding the heat generated by the light sources 121, 131, 141 or a material at least partly comprising polypropylene carbonate (PPC) or polymethyl methacrylate (PMMA).

To sum up, the invention relates in particular to a lighting module for a motor vehicle comprising:

a first light source and a first collimator for generating a first light beam of "low beam" type in collaboration with a first projection lens; and a second and a third light sources, the second light source collaborating with a second collimator to generate a first beam complementary to the first light beam in order to form a second light beam of "high beam" type. In order to reduce the visibility of a cut-off zone Zc in the second beam, the third light source collaborates with a third collimator and/or a second projection lens in order to form a second complementary beam which at least partly overlaps the cut-off zone Zc.

The invention is not of course limited to the examples which have just been described and numerous provisions can be added to these examples without departing from the scope of the invention. In particular, the various features, forms, variants and embodiments of the invention can be associated with one another according to various combinations in as much as they are not incompatible with or exclusive of one another. In particular, all the variants and embodiments described previously can be combined with one another.

The invention claimed is:

1. Lighting module for a motor vehicle, said lighting module comprising:
 a support;
 a first light source and a second light source secured to the support;
 a first collimator and a second collimator, the first collimator being arranged to collect at least a part of light rays emitted by the first light source and the second collimator being arranged to collect at least a part of light rays emitted by the second light source, each collimator being also arranged to redirect said light rays towards a projection lens secured to the support;
 the projection lens being arranged to shape at least a part of the light rays emitted by the light sources in order to:
 project at least a part of the light rays collected by the first collimator in a first light beam comprising a cut-off zone; and
 project at least a part of the light rays collected by the first collimator and at least a part of the light rays collected by the second collimator in a second light beam, the part of the light rays collected by the second collimator forming a first complementary beam of the first light beam, said second light beam being formed by said first light beam and said first complementary beam, said first complementary beam being delimited at least partly by the cut-off zone;
 wherein the lighting module comprises at least one third light source and an optical device arranged to shape at least a part of light rays emitted by the third light source to form a second complementary beam at least partly overlapping the cut-off zone of the first light beam, the third source and the optical device being secured to the support.

2. Lighting module according to claim 1, in which the optical device is arranged to form the second complementary beam in such a way that said second complementary beam is oriented towards a central part of the cut-off zone.

3. Lighting module according to claim 1, in which the optical device comprises at least one third collimator for collecting at least a part of the light rays emitted by the third light source and for redirecting them to at least partly overlap the cut-off zone of the first light beam and/or of the second light beam.

4. Lighting module according to claim 3, in which the projection lens arranged to shape at least a part of the light rays emitted by the first and second light sources forms a first projection lens, the lighting module comprising a second projection lens of a form that is neutral with respect to the light rays collected by the third collimator.

5. Lighting module according to claim 1, in which the projection lens arranged to shape at least a part of the light rays emitted by the first and second light sources forms a first projection lens, and in which the optical device comprises at least one third collimator for collecting at least a part of the light rays emitted by the third light source and for redirecting them towards a second projection lens configured to project at least a part of the light rays collected by the third collimator in order to form a second complementary beam at least partly overlapping the cut-off zone of the first light beam and/or of the second light beam.

6. Lighting module according to claim 3, in which the second projection lens is of cylindrical form with respect to the light rays collected by the third collimator.

7. Lighting module according to claim 3, in which the third collimator and/or the third light source are situated above or below a plane including an optical axis of the lighting module.

8. Lighting module according to claim 4, in which the second projection lens is situated below or above the first projection lens.

9. Lighting module according to claim 4, in which the second projection lens is made of a single piece with the first projection lens.

10. Lighting module according to claim 4, in which the second projection lens is added to the first projection lens and securely fixed to said first projection lens by fixing means.

11. Lighting module according to claim 4, in which the first projection lens comprises a single focal plane towards which the first collimator and the second collimator are arranged to redirect the corresponding light rays.

12. Lighting module according to claim 4, in which the third collimator is arranged to redirect light rays from the third light source towards a focal plane of the second projection lens distinct from the focal plane of the first projection lens.

13. Lighting module according to claim 12, in which a first focal distance separating the first projection lens from the focal plane of said first projection lens is greater than a second focal distance separating the second projection lens from the focal plane of said second projection lens.

14. Lighting module according to claim 12, in which a first focal distance separating the first projection lens from the focal plane of said first projection lens is less than a second focal distance separating the second projection lens from the focal plane of said second projection lens.

15. Lighting module according to claim 1, in which at least one of the first and second collimators extends towards the focal plane of the first projection lens to reflect a part of the light emitted by the other collimator to form the cut-off zone of the first light beam and/or of the second light beam.

16. Lighting module according to claim 1, in which at least one of the first and second collimators is arranged to form the cut-off zone by external reflection of at least a part of the light rays collected by the other collimator.

17. Lighting module according to claim 1, in which at least one of the first and second collimators is arranged to form the cut-off zone of the first light beam by glass reflection of at least a part of the light rays collected by the other collimator.

18. Lighting module according to claim 1, in which at least one of the first and second collimators comprises a reflecting coating arranged over a part of said collimator and intended to reflect at least a part of the light rays collected by the other collimator.

19. Lighting module according to claim 18, in which the part of the collimator over which the coating is arranged extends from the focal plane towards the corresponding light source.

20. Lighting module according to claim 1, in which the first-and/or the second and/or the third collimator are separated by a medium of refractive index lower than a refractive index of said collimators.

21. Lighting module according to claim 1, in which the first and/or the second and/or the third light sources are arranged so as to emit light rays in directions substantially parallel to the optical axis of the lighting module.

22. Motor vehicle headlight comprising at least one lighting module according to claim 1.

* * * * *